Nov. 27, 1951   J. H. HILL   2,576,222
BICYCLE CARRIER

Filed Sept. 22, 1948   2 SHEETS—SHEET 1

INVENTOR.
JAMES H. HILL
BY
Barnes, Kisselle, Laughlin & Raisch
ATTORNEYS

Nov. 27, 1951
J. H. HILL
2,576,222
BICYCLE CARRIER
Filed Sept. 22, 1948
2 SHEETS—SHEET 2
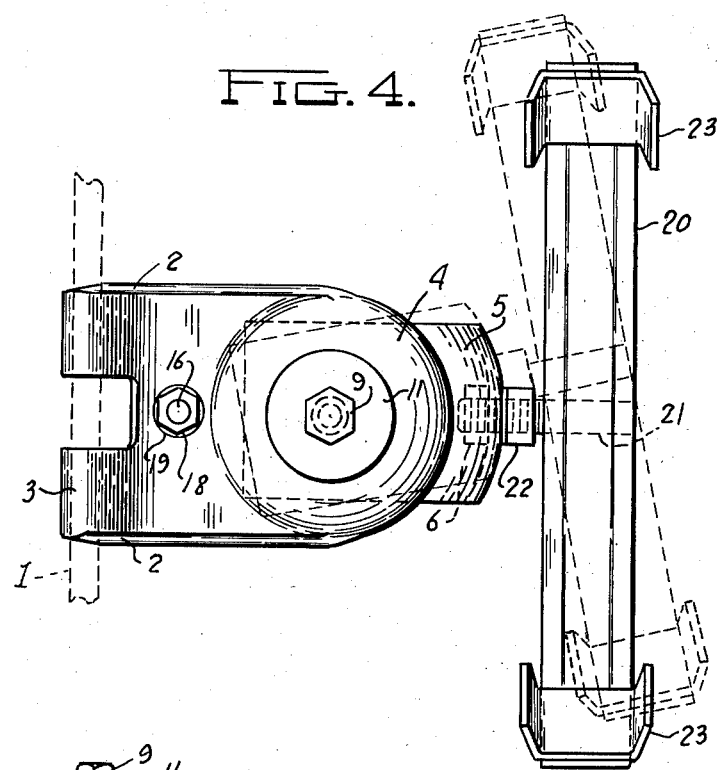
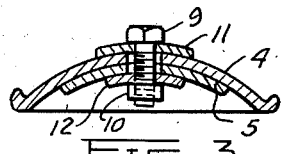
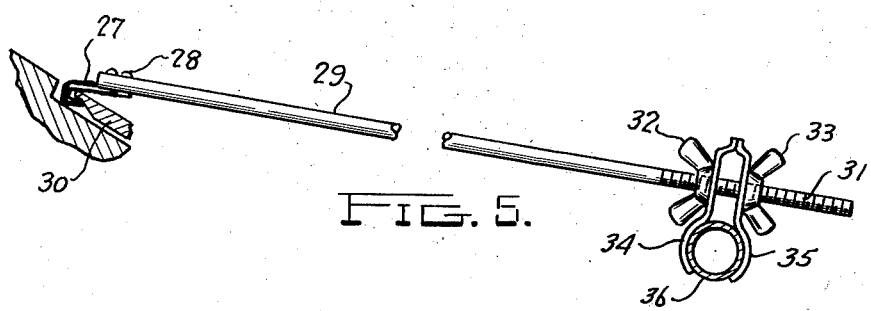
INVENTOR.
JAMES H. HILL
BY
Barnes, Kisselle, Laughlin & Raisch
ATTORNEYS Patented Nov. 27, 1951

2,576,222

UNITED STATES PATENT OFFICE 2,576,222

BICYCLE CARRIER

James H. Hill, Dearborn, Mich.

Application September 22, 1948, Serial No. 50,473

5 Claims. (Cl. 224—42.03)

1

This invention relates to bicycle carriers to be used on the bumper of an automobile.

It is the object of the invention to provide a bicycle carrier of very simple construction which can be made in large production to sell for a minimum price. Another object of the invention is to provide a carrier which is made of several rather simple independent tire grippers or stirrup units which can be easily shipped and easily handled by the retailer. These units can be varied slightly to accommodate them to the bumpers of different cars without varying the dies that are used to stamp the main part of the unit. This will more fully appear hereinafter.

Another object of the invention is to provide left and right supporting units for the tires which are interchangeable and which are easily adjustable to adapt them to the different angularities of the bumpers of different cars.

Referring to the drawings:

Figure 3 is a section on the line 3—3 of Figure 2.

Figure 4 is a top plan view of one of the tire supporting units showing in dotted lines how the angularity of the stirrup may be varied.

Figure 5 is a section on the line 5—5 of Figure 1.

Figure 1:
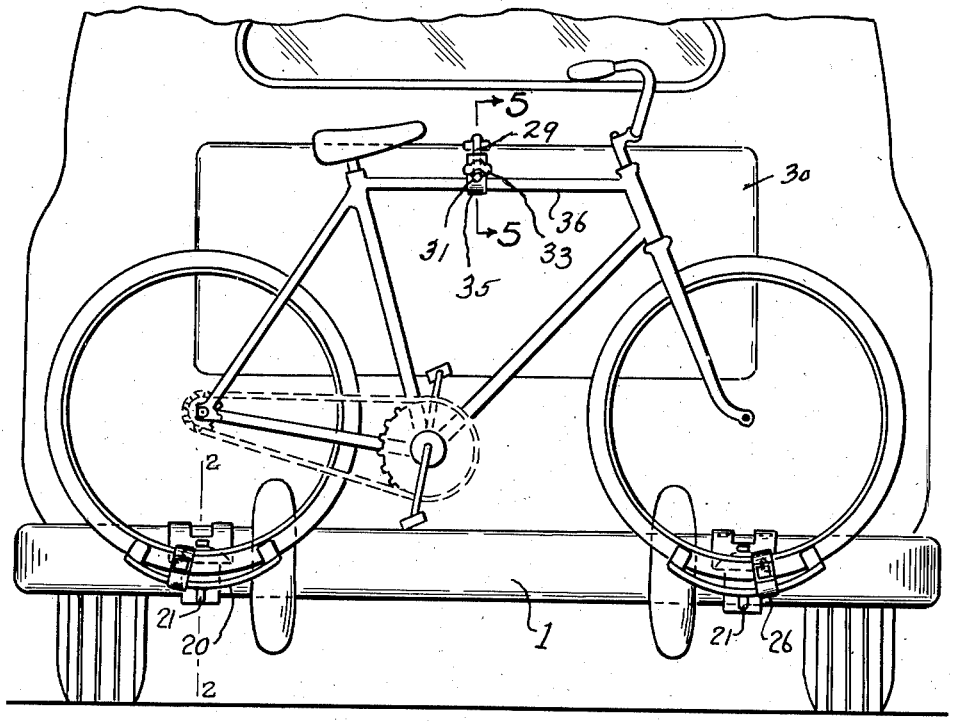
Figure 1 is an elevation of the rear of an automobile showing the carrier.
Figure 2:
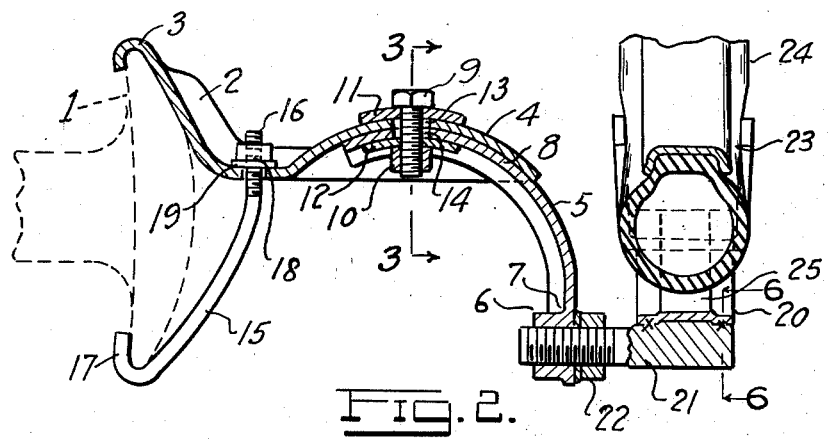
Figure 2 is a section on the line 2—2 of Figure 1.
Figure 6:
Figure 6 is a section on the line 6—6 of Figure 2.

1 designates the rear bumper on which the wire supporting unit shown in Figures 2 and 3 is arranged to be clamped. This supporting unit comprises a stamping or elbow 2 which has a hooked upper end 3 adapted to hook over the top of the bumper 1. The stamping at the other end is formed into part-spherical portion 4 adapted to fit over a second stamping or outer elbow 5. The lower end of this member has a nut 6 welded at 7 to the underside of the elbow member 5. The top of this elbow is formed into part-spherical bearing member 8 arranged to fit under and be complimentary to part-spherical portion 4 of the inner elbow 2. These part-spherical portions 4 and 8 of elbows 2 and 5 form a ball and socket joint. The part-spherical portions are bolted together by bolt 9 and nut 10 with intervening part-spherical washers 11 and 12. This bolt passes through enlarged openings 13 and 14 in the elbows 2 and 5 so that when the bolt and nut are loosened there is a limited amount of adjustment of the two members for relative movement in a

2 vertical plane and very considerable adjustment of angularity of one member with respect to the other by relative movement in a horizontal plane as shown in Figure 4.

A rod like hook member 15 has one end threaded at 16 and the other end bent into a hook 17 arranged to fit under the bumper. A nut 18 screwing onto the threaded end 16 can be turned on against the washer 19 to clamp the tire supporting unit to the bumper when the hook end 3 of member 2 is hooked over the top of the bumper. This elbow stamping 2 can be stamped out by a set of dies with the hook end 3 flat. Then the hook end 3 may be bent over independently to adapt it to the bumper used on any particular car. This may be done by dies if the amount of production for any particular bumper warrants a set of dies. If the production for the bumper is rather small this may be done by some less expensive way.

The outer elbow member 5 is secured to a tire gripping member or stirrup 20 by means of bolt 21 which is screwed into the nut 6. This can be done by means of the flats cut on the sides of the bolt to permit the wrench to grip the bolt. The jam nut 22 is used to secure the bolt tightly to the nut 6 after it has been turned in place. Then the bolt 21 is arc welded to the stirrup 20. This stirrup is a segment of a ring which has a radius less than the radius of the tire which it is designed to fit. At each end of the ring segment is a pair of lugs 23. These lugs are spaced somewhat less than the width of the tire 24 so that they bite into the tire as shown plainly in Figure 2. Consequently when the two bicycle tires are fitted into the two stirrups they securely grip the tires and tend to hold the bicycle in upright position. By reason of the radius of the ring segment forming the stirrup being less than the radius of the tire, this leaves a space 25 (see Figure 2) between the tire and the bottom of the stirrup. This is advantageous in connection with the use of the leather strap 26 which is used to strap the tire to the tire stirrup so that the bicycle cannot be jolted out of the tire grippers.

A tie and spacer rod is used for bracing the top of the bicycle. This rod has a rubber coated hook 27 at the upper end, riveted thereon by rivets 28. This allows the upper end of the tie rod 29 to hook in over the overlap flange of the hinged edge of the deck lid 30. The opposite end of the rod is threaded at 31 to receive the wing nuts 32 and 33 which are used to clamp the straps 34 and 35 over the horizontal cross bar 36 of the bicycle. A tie and spacer rod of this kind is shown and described in my prior application 748,928, now abandoned, filed March 19, 1947. This rod is claimed in my prior application as originally filed and the present application is a continuation of such prior application insofar as these claims are concerned.

The tie rod in the present application is shown connecting the top or overlap flange of the rear deck lid with the horizontal cross bar 36 of the bicycle, but obviously more than one reach bar can be used to connect other tubes of the bicycle as shown in my prior application.

As already stated, the hooked end 3 of the stamping 2 has to be especially formed for each particular bumper with which it is to be used. The same is true of the rod like hook bolt member 15. The stirrup can be adjusted up and down in a vertical plane or adjusted in a horizontal plane as shown in Figure 4 to take care of the bend or angularity of any type of bumper so that the stirrups can be readily brought into line or into one plane, if this is desired, or to locate the wheels out of one plane in any desired angularity. When the adjustment has been made to bring the two elbows into proper locations and the nut 18 turned down to securely clamp the unit to the bumper, the bicycle may be set in the stirrups by forcing the tires down into the gripping lugs of the stirrups. Thereupon the hook 27 of the tie and spacer rod 29 may be hooked into the opening between the overlap flange of the rear deck lid and the deck and then the clamping straps 34 and 35 brought around the cross bar 36. Thereupon the wing nuts 32 and 33 may be tightened to secure the rod to the cross bar of the bicycle. The rod and the stirrups now firmly hold the bicycle in position, but to make sure that the bicycle does not bump out, the leather straps 26 may be put in place and tightened.

What I claim is:

1. A bicycle carrier for supporting a bicycle on an automobile, comprising two clamps which can be independently and separately clamped to the bumper at spaced points to support the separated wheels of the bicycle, each of said clamps comprising an outer and inner elbow, the inner elbow having one end that can be hooked over the top of the bumper and a hook-like clamping member for clamping under the bottom of the bumper, the outer elbow having a stirrup to receive the tire with means for securing the tire in the stirrup, the said elbows overlapping and bolted together for angular adjustment in a horizontal plane and longitudinal adjustment to bring the stirrups into the correct plane to receive the tires of the bicycle notwithstanding the angle or curvation of the bumper around the back of the car.

2. A bicycle carrier for supporting a bicycle on an automobile, comprising two clamps which can be independently and separately clamped to the bumper at spaced points to support the separated wheels of the bicycle, each of said clamps comprising an outer and inner elbow, the inner elbow having one end that can be hooked over the top of the bumper and a hook-like clamping member for clamping under the bottom of the bumper, the outer elbow having a stirrup to receive the tire with means for securing the tire in the stirrup, the said elbows overlapping and bolted together for angular adjustment in a horizontal plane and longitudinal adjustment to bring the stirrups into the correct plane to receive the tires of the bicycle notwithstanding the angle or curvation of the bumper around the back of the car, the said overlapping elbows having their overlapping portions partly spherical and bolted together through enlarged openings to permit angular adjustment in the vertical planes and also angular adjustment of one stirrup with respect to the other stirrup in a horizontal plane.

3. The combination claimed in claim 1 in which the stirrup has a bolt welded thereto which is removably bolted to the outer end of the outer elbow.

4. The combination claimed in claim 1 in which the stirrup comprises a ring segment having turned up lugs or ears at its outer ends spaced less than the width of the tires to bite into the tires when the tire is forced down into the stirrup.

5. The combination claimed in claim 1 in which the stirrup is a ring segment having gripping lugs at each end and which ring segment is formed on a radius less than the radius of the tire so that the midportion of the stirrup is spaced from the tire, and a strap for strapping the wheel and tire to such stirrup.

JAMES H. HILL.

REFERENCES CITED

The following references are of record in the file of this patent:

UNITED STATES PATENTS

| Number | Name | Date |
|---|---|---|
| 1,463,409 | Theiss | July 31, 1923 |
| 1,830,183 | Austin | Nov. 3, 1931 |
| 2,106,503 | Hendrick | Jan. 25, 1938 |
| 2,415,286 | Hyde | Feb. 4, 1947 |
| 2,431,400 | Iverson | Nov. 25, 1947 |
| 2,489,771 | Gibson | Nov. 29, 1949 |

FOREIGN PATENTS

| Number | Country | Date |
|---|---|---|
| 97,617 | Sweden | Dec. 12, 1939 |
| 102,010 | Sweden | July 8, 1941 |